Sept. 11, 1951      A. S. PARKS      2,567,527
PACKING ASSEMBLY
Filed July 6, 1948
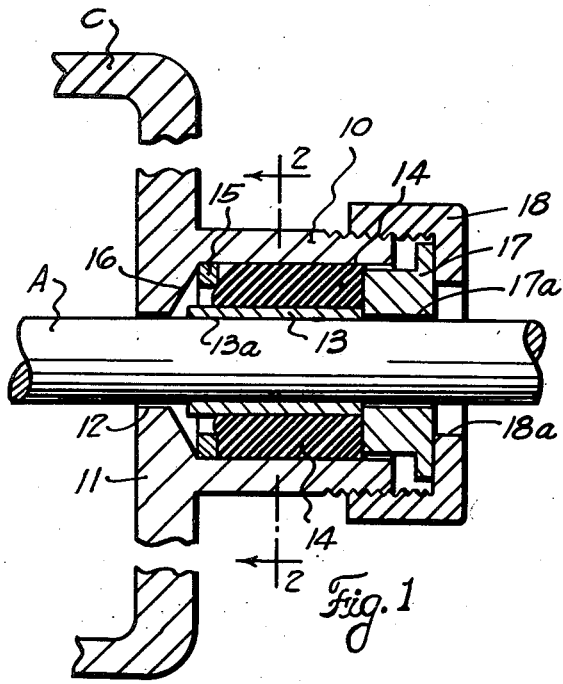
Fig. 1
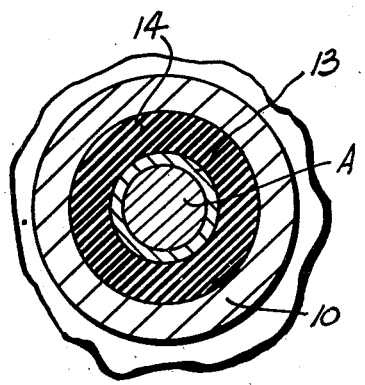
Fig. 2
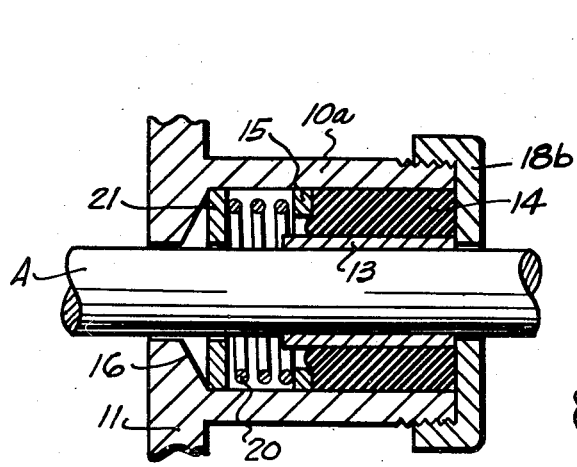
Fig. 4
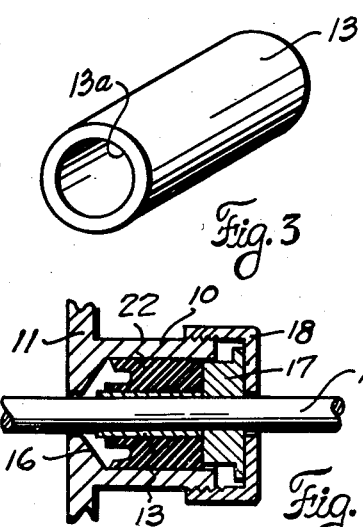
Fig. 3
Fig. 5
Inventor
Asbury S. Parks
By Joe E. Edwards
Attorney Patented Sept. 11, 1951

2,567,527

UNITED STATES PATENT OFFICE 2,567,527

PACKING ASSEMBLY

Asbury S. Parks, Houston, Tex.

Application July 6, 1948, Serial No. 37,184

8 Claims. (Cl. 286—26)

This invention relates to new and useful improvements in packing assemblies.

One object of the invention is to provide an improved packing assembly which is particularly adapted for use in packing off around a movable stem, rod or similar member and which will efficiently maintain an effective seal without interfering or impeding the movement of said member.

It is generally recognized that rubber, rubber compound or similar materials which have an inherent elasticity are best suited for packing material because such material may be deformed into packing position to exert a desired pressure on the member or element being sealed. The inherent elasticity which constantly tends to return the material to its initial or original shape functions to maintain effective sealing contact with the member being packed off. However, in the case of a rotatable or movable element, as for example, a metallic valve stem, the use of a rubber packing in contact with the stem is not too efficient because dry rubber has a high coefficient of friction on metal, with the result that when sufficient pressure is applied to the rubber to effect a sealing contact between said rubber and stem, the friction between the rubber and stem is so great that it interferes with and impedes the movement of said stem. Efforts have been made to overcome this disadvantage by impregnating the rubber with graphite, or other lubricants or by interposing a lubricant, such as grease, between the metallic member and the packing material. There are certain materials available which have a low coefficient of friction and which are capable of being deformed into sealing contact; however, these materials do not have the property of inherent elasticity, such as rubber which will return them to their original shape upon release of pressure thereon.

It is an important object of this invention to provide an improved packing assembly which is particularly adapted for use in packing off around an axially movable or rotatable element and which retains all of the advantages of rubber or similar elastic packing material while eliminating the usual disadvantages caused by the frictional engagement of rubber with the movable element, whereby an exceptionally efficient seal may be maintained without interfering with or impeding the movement of the element through the packing assembly.

Another object of the invention is to provide an improved packing assembly for packing off around an axially movable element which comprises an annular elastic packing member surrounding the element, together with a sealing member interposed between the packing member and the movable element; said sealing member being yieldable or plastically deformable under high stress and also being chemically inert to the fluids being sealed, as well as having an extremely low coefficient of friction when in a dry state, whereby the elastic packing member may be utilized to force and maintain the sealing member in tight sealing engagement with the movable element and also whereby said sealing member, because of its low coefficient of friction, will not resist or impede the movement of the movable element therethrough, regardless of the force exerted on the sealing member.

Another object of the invention is to provide an improved packing assembly, of the character described, wherein the elastic packing member which is utilized to urge the sealing member into sealing engagement with the movable stem or element to be packed off, is initially pre-loaded, that is, placed under an initial stress and is then exposed to the pressure of the fluid which is being sealed off, whereby the force urging the sealing member into engagement with the movable element is the force of the initial pre-load of the packing member plus the pressure of the fluid being sealed so that the force acting to maintain the sealing contact between the sealing member and the element is always greater than the pressure of the fluid being sealed.

A further object of the invention is to provide an improved packing assembly which includes a sealing sleeve constructed of a material having a low coefficient of friction with a metallic part, and also being chemically inert to the common fluids encountered in industry, substantially unaffected over a wide temperature range, as well as being yieldable or plastically deformable under high stress; said sealing sleeve being combined with an annular elastic packing member in such a manner that a radial force or pressure may be applied to said sleeve, whereby said sleeve may be urged and maintained in sealing engagement with a movable element, such as a valve stem, piston rod, or the like to effectively seal around said element without interfering with or retarding the movement thereof.

A still further object of the invention is to provide an improved packing assembly, of the character described, for sealing off around a movable stem or element which is extremely simple in construction and which eliminates the necessity of employing grease or other lubricant for the purpose of assuring substantially free movement of and efficient sealing around the stem or element.

Still another object of the invention is to provide a packing assembly, of the character described, wherein the elastic packing member which is combined with the improved sealing sleeve may take the form of an annular packing collar, sleeve or cup and may be exposed to the pressure of the fluid being sealed, whereby constant radial pressure against the sealing sleeve, sufficient for effective sealing, is assured.

The construction designed to carry out the invention will be hereinafter described together with other features of the invention.

The invention will be more readily understood from a reading of the following specification and by reference to the accompanying drawing, wherein an example of the invention is shown, and wherein:

Figure 1 is a longitudinal, sectional view of a packing assembly, constructed in accordance with the invention, Figure 2 is a transverse, vertical, sectional view, taken on the line 2—2 of Figure 1, Figure 3 is an isometric view of the sealing sleeve, Figure 4 is a view, similar to Figure 1, showing a slightly modified form of the invention, and Figure 5 is a view, similar to Figures 1 and 4 of still another form of the invention.

In the drawings, the numeral 10 designates a cylindrical housing which is adapted to contain the improved packing assembly. One end of the housing is open, while the opposite end is closed by an end wall 11 having an axial opening 12 therein. The cylindrical element A which is adapted to be packed off and which may be an axially movable or rotatable valve stem or the like is arranged to extend through the opening 12 and also to project beyond the opposite open end of the housing 10. The housing 10 and end wall 11 are preferably made integral with a casing C, only a portion of which is shown, and said casing may contain the pressure which is to be sealed off around the element A. The external diameter of the element or stem A is slightly less than the opening 12 through the end wall 11, whereby the pressure from within the casing C may pass into the interior of the packing assembly housing 10.

For sealing off around the element or stem A, a sealing sleeve 13 surrounds the element within the housing 10. This sealing sleeve is an important feature of the invention and is constructed of a material which has certain properties. This material is essentially a solid at the temperature ranges which are normally encountered and is also chemically inert to the ordinary fluids which are to be sealed off. Although essentially a solid, the sleeve 13 is yieldable or plastically deformable whereby a radial pressure against its exterior surface will urge the bore 13a of the sleeve into tight sealing engagement with the element or stem. The most important property of the material of which the sleeve 13 is constructed is that said sleeve has an extremely low coefficient of friction when in a dry state, whereby when the sleeve is in tight sealing engagement with the stem, the stem may move freely through the sleeve without affecting the seal therebetween. Thus, it will be seen that the sealing sleeve 13 may be urged into tight sealing engagement with the axially movable or rotatable element or stem and at the same time said sleeve will not materially interfere with said movement. Furthermore, it is not necessary to employ grease or oil to maintain the seal while permitting free sliding movement of the element through the sleeve.

As an example of one type of material which may be employed, reference is made to the material identified as "Teflon" and manufactured by E. I. du Pont de Nemours and Company of Arlington, New Jersey. "Teflon" is a trade-mark applied to the polymers of tetrafluoro ethylene. This material has no true melting point and may operate over an excessively wide range of temperatures which extend from minus 100° F. to 480° F. The material is substantially chemically inert and withstands the attack of all materials and strong alkalies with the possible exception of molten alkali metals. It has an extremely low coefficient of friction with metal so that when in close sealing engagement with the metal, it does not resist the movement of said metal with respect thereto, as would be the case in a rubber or similar material packing which, as is well known, has an extremely high coefficient of friction when in a dry state.

From the foregoing it will be evident that the sealing sleeve 13 has the desirable sealing and friction properties but lacks the property of being deformable with the tendency to return to original shape when the force acting thereon is released, which latter property is, of course, present in rubber or rubber like compounds. The sleeve is yieldable or deformable into tight sealing engagement but does not have the inherent property of returning to its original shape after the realease of pressure thereagainst. Therefore, in order to maintain the sleeve 13 in close sealing engagement with the cylindrical element or stem A, an elastic packing member or sleeve 14 is confined within the housing 10 and surrounds the sleeve. The inner end of the elastic packing member, which may be constructed of rubber, rubber compound or similar material has its inner end abutting a metallic ring 15 which is adapted to engage an annular beveled seat 16 formed on the end wall 11 surrounding the axial opening 12. As is clearly shown in Figure 1 the width of the ring 15 is less than the transverse width or thickness of the wall of the packing member 14 so that a portion of the end of the packing member is exposed to the pressure which may flow into the interior of the housing through the opening 12 in the end wall.

For applying a desired pressure to the elastic packing member 14 so that a radial pressure is applied to the sealing sleeve 13, a flanged packing gland 17 has its inner end extending into the open end of the housing 10. The gland is, of course, formed with an axial opening 17a through which the element or stem A extends. A flanged retaining cap 18 having a central opening 18a encloses the packing gland and is arranged to thread on the outer end of the housing 10. It will be evident that by tightening the retaining cap, a pressure may be exerted upon the gland 17 which in turn applies a suitable force to the elastic packing member 14 to initially deform the packing member between the gland and the seating ring 15. This force applied to the packing member applies a predetermined radial force to the sealing sleeve 13 and functions to urge said sleeve into effective sealing contact with the element or stem A. Thus, the packing member is placed under an initial stress sufficient to effectively seal between the sleeve 13 and the element A. As explained, the sleeve has a low coefficient of friction with metal when in a dry state and thus an efficient seal around the element may be had without interfering with the movement of the element or stem. Also it is not necessary to employ grease, oil or other lubricant to permit free movement of the stem while maintaining a proper seal.

The tightening of the retaining cap and the pressure exerted upon the packing member 14 preloads the elastic packing member so that a predetermined circumferential pressure is applied to the sealing sleeve. The end of the elastic packing member is also exposed to the pressure which is being sealed and this pressure is admitted through the axial opening 12 in the end wall 11 and acts against the packing member. The force of this pressure when added to the preload on the packing member assures that the sealing sleeve will maintain efficient sealing because obviously the only pressure tending to separate the sleeve from its engagement with the stem is the pressure within the interior of the housing 10 entering through the opening 12. Therefore, it will be seen that the sealing sleeve will be maintained in sealing engagement to properly seal off around the axially movable or rotatable element or stem.

In Figure 4 a modified form of the invention is shown. In this form, a housing 10a which is similar in construction to the housing 10 is somewhat elongated and the packing member 14 and sealing sleeve 13 are disposed in the outer portion of the bore of said housing. A retaining cap 18b is threaded onto the end of the housing and the packing member and sleeve abuts said cap, being maintained in engagement therewith by a coil spring 20 which is confined between the metallic ring 15 at the inner end of the packing member and a retaining plate 21 which engages the annular seat 16 in the end wall 11.

In this modified form of the invention the packing member 14 is preloaded by the coil spring 20, rather than by the pressure applied by the retaining cap 18b. As in the first form the packing is also exposed to the pressure being sealed off so that the force which is exerted circumferentially on the sealing sleeve is the force of the spring plus the force of the pressure being sealed.

Still another form of the invention is illustrated in Figure 5 and in this modification a pressure sealing ring 22 is substituted for the elastic packing member 14 of the first form shown in Figure 1. In this case the pressure being sealed acts against the pressure sealing ring 22 to apply a circumferential pressure to the sealing sleeve 13 to maintain an effective seal.

The important feature of the invention resides in the provision of a packing assembly and efficient seal around a movable member or stem without interfering with the movement of said stem; also the seal is maintained without the necessity of employing grease, oil or other lubricant to assure the maintenance of the seal. As has been previously noted, rubber or similar material having an inherent elasticity is best suited for packing material but because of its high coefficient of friction has definite disadvantages in sealing off around a movable element. A material such as "Teflon" has the desirable low coefficient of friction as well as being chemically inert; however, this type of material although deformable does not have the inherent elasticity or the function of returning to its original shape when stress is removed. In the present invention the assembly combines all of the advantages of the sealing sleeve with the advantages of the elastic packing member, without the inherent disadvantages of either individually. In other words, by the combination shown and described herein, the sealing sleeve may be preloaded and may be maintained at all times in sealing engagement and yet a rotatable or axial movement of the element therethrough is not interfered with in any manner. Although the material "Teflon" has been indicated as desirable, it will be evident that the sleeve 13 may be constructed of any material having a low coefficient of friction with the element A and yet being capable of sealing off therewith.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A packing assembly for packing off around an element including, a housing having said element extending axially therethrough, a sealing sleeve surrounding said element constructed of a material which is plastically deformable but incapable of returning to its original shape subsequent to sustained deformation, said sleeve having a wall thickness which allows the sleeve to be deformed in a radial direction but which prevents appreciable plastic deformation by an axial compressive force before structural failure, an annular elastic body having an axial bore disposed within the housing, said sealing sleeve extending entirely through the bore of the body whereby said body spans the annular space between the exterior surface of the sleeve and the interior surface of the housing, said elastic body being confined within the annular space to initially preload said body to deform the same and reduce the normal inner diameter of the bore of the body to thereby apply a uniform radial external pressure on the sealing sleeve, the thickness of the wall of the sleeve bearing such a relationship to the pressure which is applied to the sleeve by the preloading of the elastic body that said preloading pressure is sufficient to deform the sleeve radially inwardly into tight sealing engagement with the element extending therethrough, said sealing sleeve being free from any axial compression in final assembly and being contructed of a material having a low coefficient of friction with the element when in tight sealing engagement therewith.

2. A packing assembly as set forth in claim 1, wherein one end of the elastic body is exposed to the pressure which is sealed by the sealing sleeve whereby said pressure is added to the initial preload of the body to maintain said body in a position urging the sealing sleeve in engagement with the element.

3. A packing assembly as set forth in claim 1, wherein the material of which the sealing sleeve is constructed is polytetrafluoroethylene.

4. A packing assembly as set forth in claim 1, wherein the initial preload is applied to the elastic by making the annular thickness of said body greater than the distance between the inner wall of the housing and the exterior of the sealing sleeve, and also wherein one end of the elastic body is formed with flared sealing lips exposed to the pressure being sealed by said sealing sleeve.

5. A packing assembly for packing off around an element including, a housing having said element extending axially therethrough, a sealing sleeve surrounding said element and having a relatively thin wall and being constructed of a material which is plastically deformable but incapable of returning to its original shape subsequent to sustained deformation, an annular elastic body within the housing and having the sealing sleeve extending entirely therethrough, said body spanning the annular space between the exterior surface of the sleeve and the interior surface of the housing, an abutment within the housing engaging and confining one end of the body, annular means engaging the opposite end of the body and having an area less than the cross-sectional area of that end of the body, means for applying an axial force to said body to deform the body between the abutment and annular means, whereby the body is deformed radially inwardly to deform the sealing sleeve into tight sealing engagement with the element, said sealing sleeve being free from axial compression and being constructed of a material having a low coefficient of friction with the element when in tight sealing engagement therewith.

6. A packing assembly as set forth in claim 5, wherein one end of the elastic body is exposed to the pressure being sealed by the sealing sleeve whereby said pressure is added to that exerted upon the body by the force-applying means.

7. A packing assembly as set forth in claim 5, wherein the means for applying the axial force to the elastic body is a spring confined within the housing and having one end engaging the annular means.

8. A packing assembly as set forth in claim 5, wherein the material of which the sealing sleeve is constructed is polytetrafluoroethylene.

ASBURY S. PARKS.

REFERENCES CITED

The following references are of record in the file of this patent:

UNITED STATES PATENTS

| Number | Name | Date |
|---|---|---|
| 173,638 | Hughes | Feb. 15, 1876 |
| 660,167 | Rigby | Oct. 23, 1900 |
| 1,438,527 | Holmes | Dec. 12, 1922 |
| 2,393,967 | Brubaker | Feb. 5, 1946 |
| 2,467,312 | Jack | Apr. 12, 1949 |

FOREIGN PATENTS

| Number | Country | Date |
|---|---|---|
| 583,194 | Great Britain | of 1946 |